United States Patent
Maeda

[11] 3,989,317
[45] Nov. 2, 1976

[54] OBJECTIVE LENS SYSTEM
[75] Inventor: Haruo Maeda, Fuchu, Japan
[73] Assignee: Olympus Optical Co., Ltd., Tokyo, Japan
[22] Filed: Feb. 12, 1975
[21] Appl. No.: 549,457

[30] Foreign Application Priority Data
Feb. 21, 1974 Japan.................. 49-20688

[52] U.S. Cl. .................................................. 350/229
[51] Int. Cl.² ......................................... G02B 9/12
[58] Field of Search ...................................... 350/229

[56] References Cited
UNITED STATES PATENTS
3,272,072  9/1966  Ziegler.................................. 350/229

*Primary Examiner*—John K. Corbin
*Assistant Examiner*—Conrad Clark
*Attorney, Agent, or Firm*—Haseltine, Lake & Waters

[57] ABSTRACT
Achromat objective lens systems and more particularly an objective lens system having a magnification $\beta$ on the order of 10 to 30X and designed to operate particularly for the monochromatic light whose wave length is on the order of 6328 A. The lens system consists of three lens components and four lenses. The first and second lens components are positive singlet lenses. The third lens component is a positive doublet lens composed of a negative meniscus lens and a biconvex lens. The lens system is constructed so as to satisfy the following three conditions:

$$0.9f < d_2 + d_3 + d_4 < 1.3f \quad (1)$$
$$0.8f < R_6 < 1.2f \quad (2)$$
$$\left.\begin{array}{l} 1.46 < n_{1d} < 1.65 \\ 1.46 < n_{2d} < 1.65 \\ 1.46 < n_{4d} < 1.65 \\ 50 < \nu_{1d} < 68 \\ 50 < \nu_{2d} < 68 \\ 50 < \nu_{4d} < 68 \\ \nu_{3d} < 35 \end{array}\right\} \quad (3)$$

wherein f designates the overall focal length of the system given for a wave length light of 6328 A, $R_6$ designates the radius of curvature of the cemented surface of the third lens component, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the d line, respectively, and $\nu_{1d}$, $\nu_{2d}$, $\nu_{3d}$ and $\nu_{4d}$ designate the Abbe numbers of the first, second, third and fourth lenses for the d line, respectively.

4 Claims, 17 Drawing Figures

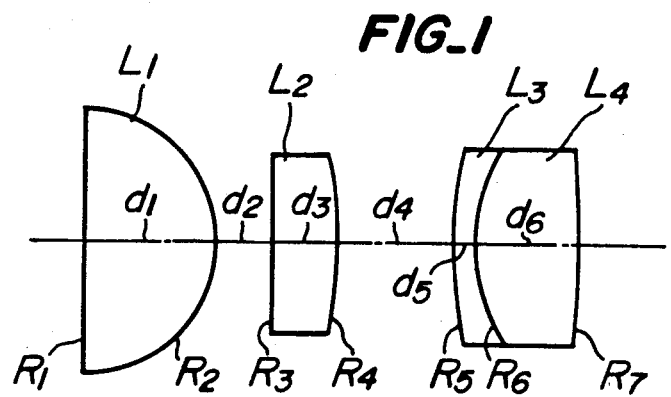

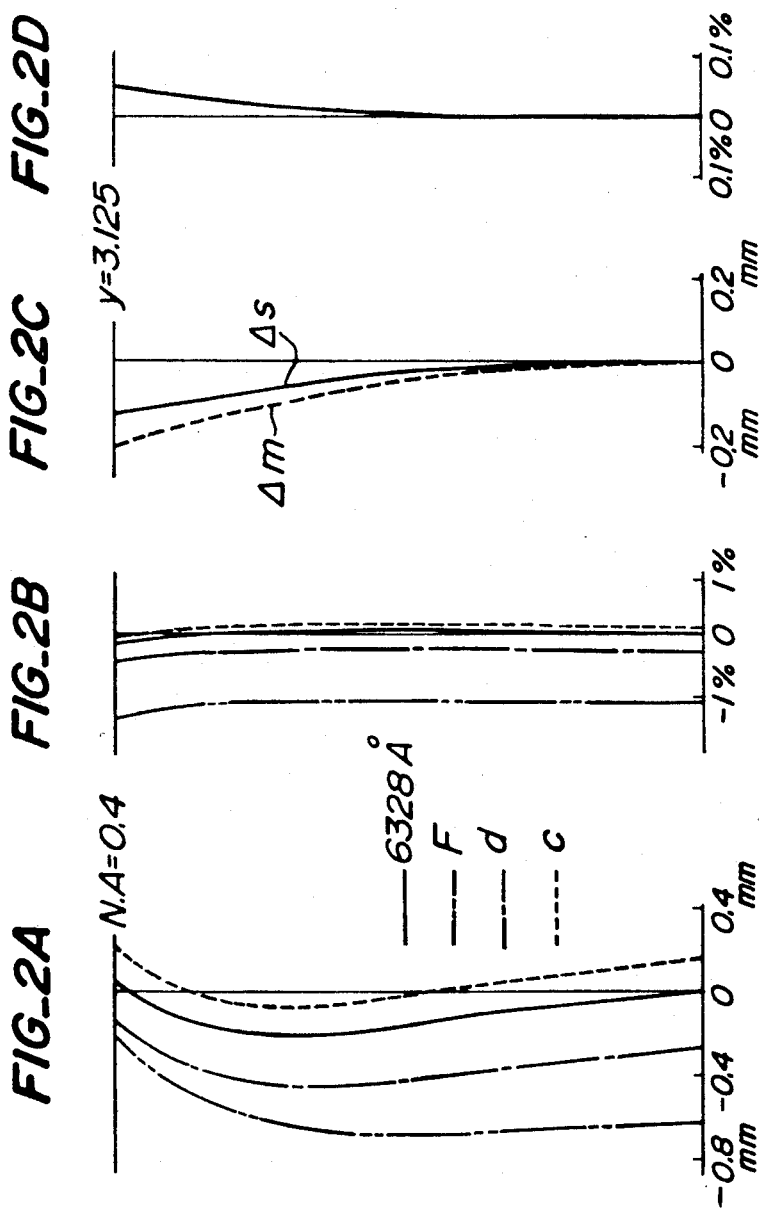

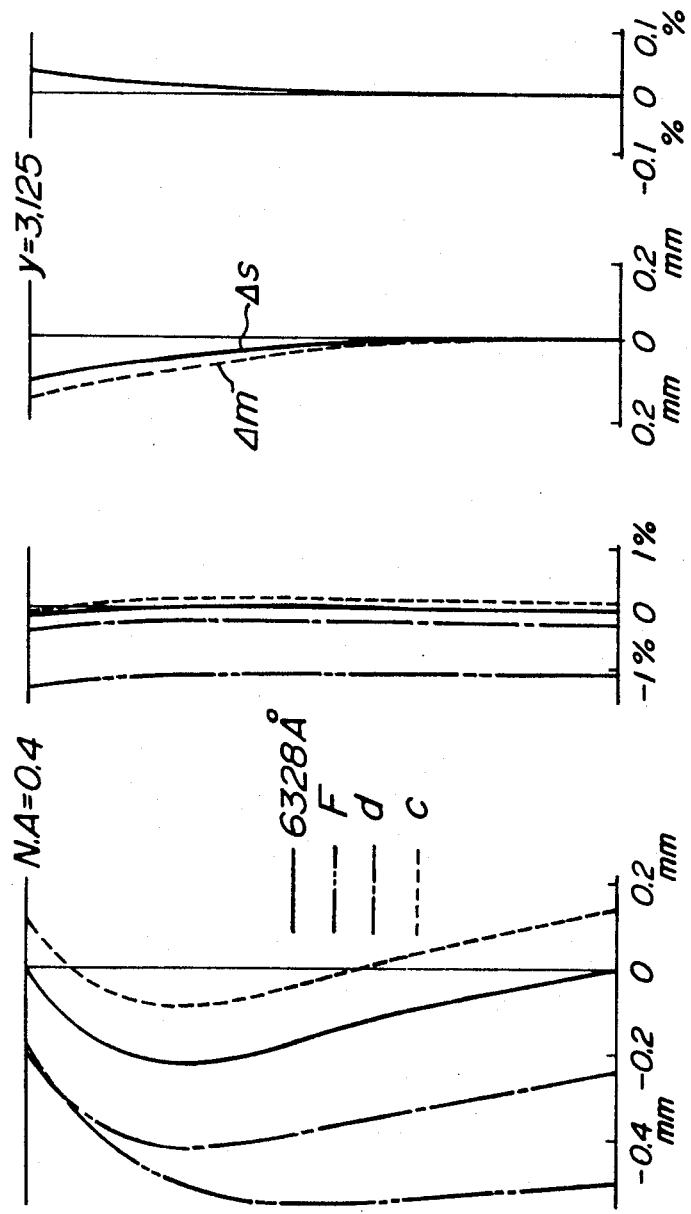

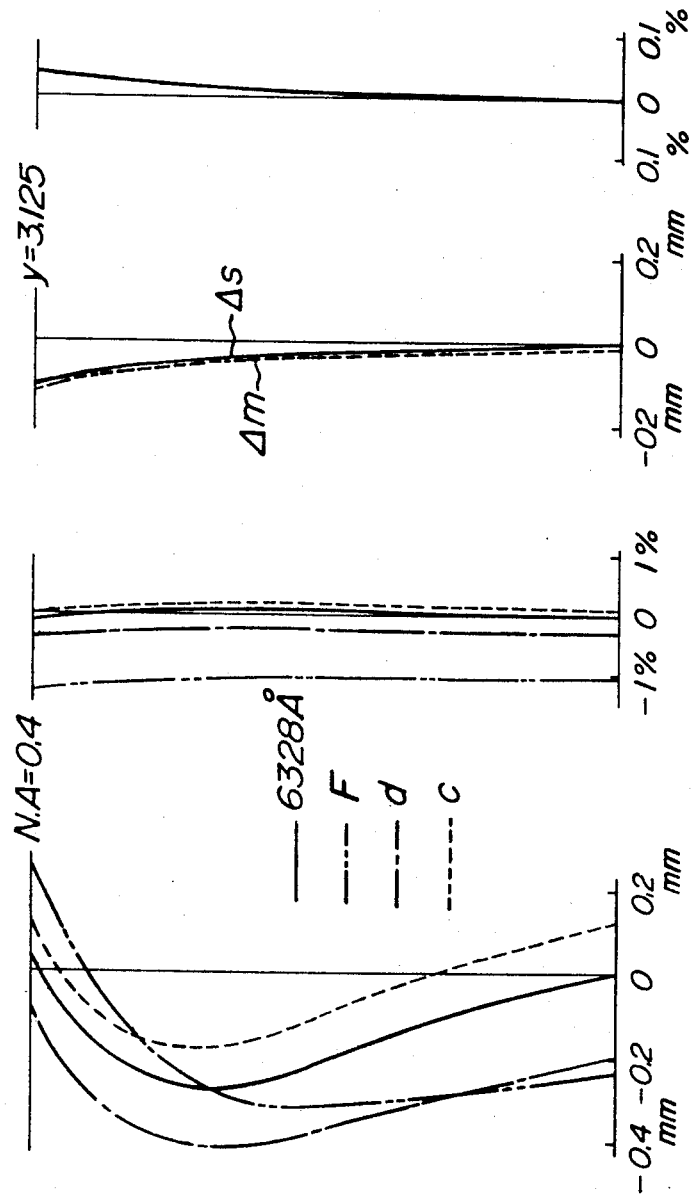

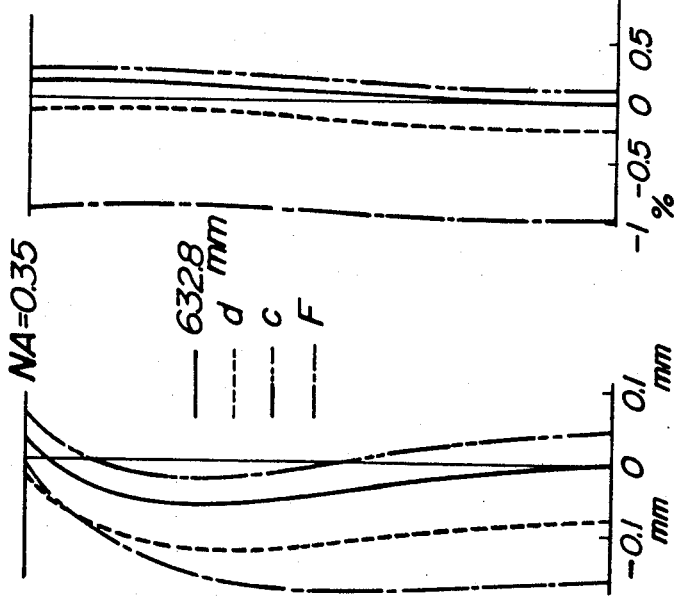

OBJECTIVE LENS SYSTEM

This invention relates to achromat objective lens systems and more particularly to an objective lens system having a magnification $\beta$ on the order of 10 to 30X.

In general, an achromat objective lens having a magnification $\beta$ on the order of 10 to 30X requires at least five lenses, becomes heavy in weight and expensive. In order to make such achromat objective lens light in weight and lens expensive, it is sufficient to reduce the number of lenses and use cheap glass having a small refractive index. However, if the number of lenses is reduced and the magnification is made on the order of 10 to 30X, the refractive power of each lens becomes great, thereby degrading the spherical aberrations in the image plane.

An object of the invention is to provide an objective lens system which is light in weight and less expensive, which has a magnification on the order of 10 to 30X, which can correct the aberrations in an extent which are the same as those encountered with the achromat objective lens within the visual field number 7, and which can correct the aberrations for the monochromatic light and particularly for a wave length light of 6328 A.

A feature of the invention is the provision of an objective lens system comprising three air-spaced lens components and four lenses which are optically aligned with each other and arranged in succession from the object side of the system, the first two lens components being positive singlets, respectively, and the third lens component being a positive doublet, and said system satisfying the following three conditions, i.e., $$0.9f < d_2 + d_3 + d_4 < 1.3f \quad (1)$$
$$0.8f < R_6 < 1.2f \quad (2)$$
$$\left. \begin{array}{l} 1.46 < n_{1d} < 1.65 \\ 1.46 < n_{2d} < 1.65 \\ 1.46 < n_{4d} < 1.65 \\ 50 < \nu_{1d} < 68 \\ 50 < \nu_{2d} < 68 \\ 50 < \nu_{4d} < 68 \\ \nu_{3d} < 35 \end{array} \right\} \quad (3)$$

wherein $f$ designates the overall focal length of the system given for a wave length light of 6328 A, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the $d$ line, respectively, and $\nu_{1d}$, $\nu_{2d}$, $\nu_{3d}$ and $\nu_{4d}$ are the Abbe numbers of the first, second, third and fourth lenses for the $d$ line, respectively.

The invention will now be described in greater detail with reference to the accompanying drawings, wherein:

FIG. 1 illustrates an objective lens system according to the invention; and

FIGS. 2A to 2D, 3A to 3D, 4A to 4D and 5A to 5D are graphical representations of the various aberrations related to Examples 1, 2, 3 and 4 of FIG. 1, respectively.

With reference to FIG. 1 of the drawing, the preferred objective lens system comprises three air-spaced lens components, $L_1$, $L_2$ and $L_3$, $L_4$ which are optically aligned with each other and arranged in succession from the object side of the system.

The first two lens components $L_1$ and $L_2$ are positive singlets, respectively. The third lens component is a positive doublet composed of a negative meniscus lens $L_3$ and a biconvex lens $L_4$ separated therefrom by a cemented surface $R_6$ which is negatively refracting.

In addition, the objective lens system according to the invention is constructed so as to satisfy the following three conditions:

$$0.9f < d_2 + d_3 + d_4 < 1.3f \quad (1)$$
$$0.8f < R_6 < 1.2f \quad (2)$$
$$\left. \begin{array}{l} 1.46 < n_{1d} < 1.65 \\ 1.46 < n_{2d} < 1.65 \\ 1.46 < n_{4d} < 1.65 \\ 50 < \nu_{1d} < 68 \\ 50 < \nu_{2d} < 68 \\ 50 < \nu_{4d} < 68 \\ \nu_{3d} < 35 \end{array} \right\} \quad (3)$$

wherein $f$ designates the overall focal length of the system given for a wave length light of 6328 A, $R_6$ designates the radius of curvature of the cemented surface of the third lens component, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the $d$ line, respectively, and $\nu_{1d}$, $\nu_{2d}$, $\nu_{3d}$ and $\nu_{4d}$ designate the Abbe numbers of the first, second, third and fourth lenses for the $d$ line, respectively.

Each of the conditions (1) to (3) defined by the invention will now be described. The condition (1) is effective in decreasing the number of lenses for the magnification on the order of 10 to 30X and insures an excellent correction of aberrations, particularly spherical aberrations within the visual field number 7 when the refractive power of each lens component is increased. If $d_2 + d_3 + d_4 > 1.3f$, the spherical aberrations are over corrected. On the contrary, if $d_2 + d_3 + d_4 < 0.9f$, an under correction of the spherical aberrations occurs. In addition, the condition (1) insures an excellent correction of the sine condition.

The condition (2) makes the lens grinding less expensive while insuring an excellent correction of the spherical aberrations. In the case of grinding lenses, if the radius of curvature of the lens to be ground becomes small if compared with its outer diameter, the number of lenses to be ground at one time between small, and as a result, the grinding is required to be effected for one lens at a time. If $R_6 < 0.8f$, the above described difficulty in grinding is encountered and hence it becomes impossible to reduce prices of the objective lens system. On the contrary, if $R_6 > 1.2f$, an under correction of the spherical aberrations occurs.

The condition (3) provides a material decrease in prices of glass of the objective lens system. The use of those glasses which are low in both the dispersive power and the refractive index as defined by the condition (3) provides a material decrease in prices of the objective lens system according to the invention.

In the case of using the objective lens system according to the invention, it is sufficient to consider the aberrations due to the monochromatic light whose wave length is on the order of 6328 A. In the case of assembling and adjusting the objective lens system, however, it is necessary to effect adjustment while viewing a pattern with the aid of light transmitted therethrough. In such adjustment during the assembling of the objective lens system, the spherical aberrations near d line (5876 A) and e line (5461 A) must be corrected by taking the designer's sensitivity to these wave lengths into consideration.

In order to significantly correct such spherical aberrations, the third component is made a doublet having a cemented surface which is negatively refracting. In addition, $\nu_{1d}$, $\nu_{2d}$ and $\nu_{4d}$ are ranged between 50 and 68 according to the condition (3), respectively, such that use may be made of cheap glasses for those lenses. The condition $\nu_{3d}<35$ insures an excellent correction of chromatic aberrations.

Four embodiments of the objective lens system shown in FIG. 1 will now be described.

EXAMPLE 1 f = 1.0 N.A. = 0.4, β = 24.92 X

| Lens | Radii | Thicknesses and separations | $n_d$ | $\nu_d$ |
|---|---|---|---|---|
| $L_1$ | $R_1$ ∞ | $d_1$ 0.6376 | $n_{1d}$ 1.51633 | $\nu_{1d}$ 64.1 |
|  | $R_2$ −0.6053 | $d_2$ 0.2623 |  |  |
| $L_2$ | $R_3$ ∞ | $d_3$ 0.3195 | $n_{2d}$ 1.51633 | $\nu_{2d}$ 64.1 |
|  | $R_4$ −1.7969 | $d_4$ 0.5483 |  |  |
| $L_3$ | $R_5$ 2.0655 | $d_5$ 0.1074 | $n_{3d}$ 1.74077 | $\nu_{3d}$ 27.8 |
|  | $R_6$ 0.8774 |  |  |  |
| $L_4$ | $R_7$ −4.5120 | $d_6$ 0.4897 | $n_{4d}$ 1.51633 | $\nu_{4d}$ 64.1 |

EXAMPLE 2 f = 1.0 N.A. = 0.4, β = 24.42 X

| Lens | Radii | Thicknesses and separations | $n_d$ | $\nu_d$ |
|---|---|---|---|---|
| $L_1$ | $R_1$ ∞ | $d_1$ 0.6046 | $n_{1d}$ 1.51633 | $\nu_{1d}$ 64.1 |
|  | $R_2$ −0.6117 | $d_2$ 0.2492 |  |  |
| $L_2$ | $R_3$ ∞ | $d_3$ 0.3037 | $n_{2d}$ 1.51633 | $\nu_{2d}$ 64.1 |
|  | $R_4$ −1.6790 | $d_4$ 0.5202 |  |  |
| $L_3$ | $R_5$ 2.6723 | $d_5$ 0.1716 | $n_{3d}$ 1.74077 | $\nu_{3d}$ 27.8 |
|  | $R_6$ 0.9532 |  |  |  |
| $L_4$ | $R_7$ −2.5604 | $d_6$ 0.3976 | $n_{4d}$ 1.51633 | $\nu_{4d}$ 64.1 |

EXAMPLE 3 f = 1.0 N.A. = 0.4, β = 24.95 X

| Lens | Radii | Thicknesses and separations | $n_d$ | $\nu_d$ |
|---|---|---|---|---|
| $L_1$ | $R_1$ ∞ | $d_1$ 0.4707 | $n_{1d}$ 1.51633 | $\nu_{1d}$ 64.1 |
|  | $R_2$ −0.5814 | $d_2$ 0.3696 |  |  |
| $L_2$ | $R_3$ ∞ | $d_3$ 0.3087 | $n_{2d}$ 1.51633 | $\nu_{2d}$ 64.1 |
|  | $R_4$ −1.3724 | $d_4$ 0.5039 |  |  |
| $L_3$ | $R_5$ 2.9667 | $d_5$ 0.1744 | $n_{3d}$ 1.74077 | $\nu_{3d}$ 27.8 |
|  | $R_6$ 0.9685 |  |  |  |
|  | $R_7$ −2.1257 | $d_6$ 0.3212 | $n_{4d}$ 1.51633 | $\nu_{4d}$ 64.1 |

EXAMPLE 4 f = 1.0, N.A. = 0.35, W.D. = 0.164, β = 13.50 X

| Lens | Radii | Thicknesses and separations | $n_d$ | $\nu_d$ |
|---|---|---|---|---|
| $L_1$ | $R_1$ ∞ | $d_1$ 0.486 | $n_{1d}$ 1.51633 | $\nu_{1d}$ 64.1 |
|  | $R_2$ −0.561 | $d_2$ 0.411 |  |  |
| $L_2$ | $R_3$ ∞ | $d_3$ 0.390 | $n_{2d}$ 1.51633 | $\nu_{2d}$ 64.1 |
|  | $R_4$ −1.345 | $d_4$ 0.359 |  |  |
| $L_3$ | $R_5$ 2.332 | $d_5$ 0.211 | $n_{3d}$ 1.74077 | $\nu_{3d}$ 27.8 |
|  | $R_6$ 0.885 |  |  |  |
| $L_4$ | $R_7$ −2.101 | $d_6$ 0.378 | $n_{4d}$ 1.51633 | $\nu_{4d}$ 64.1 |

In the above described examples 1 to 4, the front surfaces of the first and second lenses $L_1$ and $L_2$ toward the object side are made plane, respectively, for the purpose of simplifying the grinding and of making the objective lens system less expensive.

In FIGS. 2A to 2D are graphically shown various aberrations of the Example 1, in FIGS. 3A to 3D various aberrations of the Example 2, in FIGS. 4A to 4D various aberrations of the Example 3 and in FIGS. 5A to 5D various aberrations of the Example 4. FIGS. 2A to 5A show the spherical aberrations, FIGS. 2B to 5B show the sine conditions, FIGS. 2C to 5C show the astigmatisms at a wave length light of 6328 A, and FIGS. 2D to 5D show the distortions at a wave length light of 6328 A.

As stated hereinbefore, the objective lens system according to the invention comprises four lenses $L_1$, $L_2$, $L_3$ and $L_4$ arranged in three lens components successively from the object side toward the image side with a magnification on the order of 10 to 30X. Glasses of respective lenses are so selected that the objective lens system becomes lighter in weight and less expensive. In addition, various aberrations such as the spherical aberrations and the like can significantly be corrected without reference to the small number of lenses.

What is claimed is:

1. An objective lens system comprising three air-spaced lens components which are optically aligned with each other and arranged in succession from the object side of the system, the first two lens components being positive singlets, respectively, and the third lens component being a positive doublet, and said system satisfying the following three conditions, i.e., $0.9f < d_2 + d_3 + d_4 < 1.3f$      (1)
$0.8f < R_6 < 1.2f$      (2)
$1.46 < n_{1d} < 1.65$
$1.46 < n_{2d} < 1.65$
$1.46 < n_{4d} < 1.65$
$50 < \nu_{1d} < 68$      (3)
$50 < \nu_{2d} < 68$
$50 < \nu_{4d} < 68$
$\nu_{3d} < 35$ wherein $f$ designates the overall focal length of the system given for a wave length light of 6328 A, $R_6$ designates the radius of curvature of the cemented surface of the third lens component, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the $d$ line, respectively, and $\nu_{1d}$, $\nu_{2d}$, $\nu_{3d}$ and $\nu_{4d}$ designate the Abbe numbers of the first, second, third and fourth lenses for the $d$ line, respectively, the objective lens system being constructed according to the following constructional data:

$f = 1.0$ N.A. $= 0.4, \beta = 24.92$ X

| Lens | Radii | Thicknesses and separations | $n_d$ | $\nu_d$ |
|---|---|---|---|---|
| $L_1$ | $R_1\ \infty$ | $d_1\ 0.6376$ | $n_{1d}\ 1.51633$ | $\nu_{1d}\ 64.1$ |
|  | $R_2\ -0.6053$ | $d_2\ 0.2623$ |  |  |
| $L_2$ | $R_3\ \infty$ | $d_3\ 0.3195$ | $n_{2d}\ 1.51633$ | $\nu_{2d}\ 64.1$ |
|  | $R_4\ -1.7969$ | $d_4\ 0.5483$ |  |  |
| $L_3$ | $R_5\ 2.0655$ | $d_5\ 0.1074$ | $n_{3d}\ 1.74077$ | $\nu_{3d}\ 27.8$ |
|  | $R_6\ 0.8774$ | $d_6\ 0.4897$ | $n_{4d}\ 1.51633$ | $\nu_{4d}\ 64.1$ |
| $L_4$ | $R_7\ -4.5120$ |  |  |  | wherein $R_1$ to $R_7$ inclusive designate the lens curvatures, $d_1$, $d_3$, $d_5$ and $d_6$ designate the axial thicknesses of the first, second, third and fourth lenses, respectively, $d_2$ and $d_4$ designate the space between the first and second lenses and the space between the second and third lenses, respectively, $n_{1d}$ to $n_{4d}$ inclusive designate the refractive indices of the glass for the d line of the spectrum for the respective lenses and $\nu_{1d}$ to $\nu_{4d}$ inclusive designate the Abbe numbers of the lenses for the d line numbering from the front to the rear of said system.

2. An objective lens system comprising three air-spaced lens components which are optically aligned with each other and arranged in succession from the object side of the system, the first two lens components being positive singlets, respectively, and the third lens component being a positive doublet, and said system satisfying the following three conditions, i.e., $$0.9f < d_2 + d_3 + d_4 < 1.3f \quad (1)$$
$$0.8f < R_6 < 1.2f \quad (2)$$
$$\left.\begin{array}{l} 1.46 < n_{1d} < 1.65 \\ 1.46 < n_{2d} < 1.65 \\ 1.46 < n_{4d} < 1.65 \\ 50 < \nu_{1d} < 68 \\ 50 < \nu_{2d} < 68 \\ 50 < \nu_{4d} < 68 \\ \nu_{3d} < 35 \end{array}\right\} \quad (3)$$

wherein $f$ designates the overall focal length of the system given for a wave length light of 6328 A, $R_6$ designates the radius of curvature of the cemented surface of the third lens component, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the $d$ line, respectively, and $\nu_{1d}$, $\nu_{2d}$, $\nu_{3d}$ and $\nu_{4d}$ designate the Abbe numbers of the first, second, third and fourth lenses for the d line, respectively, the objective lens being constructed according to the following constructional data:

$f = 1.0$ N.A. $= 0.4, \beta = 24.42$ X

| Lens | Radii | Thicknesses and separations | $n_d$ | $\nu_d$ |
|---|---|---|---|---|
| $L_1$ | $R_1\ \infty$ | $d_1\ 0.6046$ | $n_{1d}\ 1.51633$ | $\nu_{1d}\ 64.1$ |
|  | $R_2\ -0.6117$ | $d_2\ 0.2492$ |  |  |
| $L_2$ | $R_3\ \infty$ | $d_3\ 0.3037$ | $n_{2d}\ 1.51633$ | $\nu_{2d}\ 64.1$ |
|  | $R_4\ -1.6790$ | $d_4\ 0.5202$ |  |  |
| $L_3$ | $R_5\ 2.6723$ | $d_5\ 0.1716$ | $n_{3d}\ 1.74077$ | $\nu_{3d}\ 27.8$ |
|  | $R_6\ 0.9532$ | $d_6\ 0.3976$ | $n_{4d}\ 1.51633$ | $\nu_{4d}\ 64.1$ |
| $L_4$ | $R_7\ -2.5604$ |  |  |  | wherein $R_1$ to $R_7$ inclusive designate the lens curvatures, $d_1$, $d_3$, $d_5$ and $d_6$ designate the axial thicknesses of the first, second, third and fourth lenses, respectively, $d_2$ and $d_4$ designate the space between the first and second lenses and the space between the second and third lenses, respectively, $n_{1d}$ to $n_{4d}$ inclusive designate the refractive indices of the glass for the $d$ line of the spectrum for the respective lenses and $\nu_{1d}$ to $\nu_{4d}$ inclusive designate the Abbe numbers of the lenses for the $d$ line numbering from the front to the rear of said system.

3. An objective lens system comprising three air-spaced lens components which are optically aligned with each other and arranged in succession from the object side of the system, the first two lens components being positive singlets, respectively, and the third lens component being a positive doublet, and said system satisfying the following three conditions, i.e.

$$0.9f < d_2 + d_3 + d_4 < 1.3f \quad (1)$$
$$0.8f < R_6 < 1.2f \quad (2)$$
$$\left.\begin{array}{l} 1.46 < n_{1d} < 1.65 \\ 1.46 < n_{2d} < 1.65 \\ 1.46 < n_{4d} < 1.65 \\ 50 < \nu_{1d} < 68 \\ 50 < \nu_{2d} < 68 \\ 50 < \nu_{4d} < 68 \\ \nu_{3d} < 35 \end{array}\right\} \quad (3)$$

wherein $f$ designates the overall focal length of the system given for a wave length light of 6328 A, $R_6$ designates the radius of curvature of the cemented surface of the third lens component, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the $d$ line, respectively, and $\nu_{1d}$, $\nu_{2d}$, $\nu_{3d}$ and $\nu_{4d}$ designate the Abbe numbers of the first, second, third and fourth lenses for the d line, respectively, the objective lens system being constructed according to the following constructional data:

f = 1.0 N.A. = 0.4, β = 24.95 X

| Lens | Radii | Thicknesses and separations | $n_d$ | $\nu_d$ |
|---|---|---|---|---|
| $L_1$ | $R_1$ ∞ | $d_1$ 0.4707 | $n_{1d}$ 1.51633 | $\nu_{1d}$ 64.1 |
|  | $R_2$ −0.5814 |  |  |  |
| $L_2$ |  | $d_2$ 0.3696 |  |  |
|  | $R_3$ ∞ |  |  |  |
|  |  | $d_3$ 0.3087 | $n_{2d}$ 1.51633 | $\nu_{2d}$ 64.1 |
|  | $R_4$ −1.3724 |  |  |  |
|  |  | $d_4$ 0.5039 |  |  |
|  | $R_5$ 2.9667 |  |  |  |
| $L_3$ |  | $d_5$ 0.1744 | $n_{3d}$ 1.74077 | $\nu_{3d}$ 27.8 |
|  | $R_6$ 0.9685 |  |  |  |
|  |  | $d_6$ 0.3212 | $n_{4d}$ 1.51633 | $\nu_{4d}$ 64.1 |
|  | $R_7$ −2.1257 |  |  |  | wherein $R_1$ to $R_7$ inclusive designate the lens curvatures, $d_1$, $d_3$, $d_5$ and $d_6$ designate the axial thicknesses of the first, second, third and fourth lenses, respectively, $d_2$ and $d_4$ designate the space between the first and second lenses and the space between the second and third lenses, respectively, $n_{1d}$ to $n_{4d}$ inclusive designate the refractive indices of the glass for the d line of the spectrum for the respective lenses and $\nu_{1d}$ to $\nu_{4d}$ inclusive designate the Abbe numbers of the lenses for the d line numbering from the front to the rear of said system.

4. An objective lens system comprising three air-spaced lens components which are optically aligned with each other and arranged in succession from the object side of the system, the first two lens components being positive singlets, respectively, and the third lens component being a positive doublet, and said system satisfying the following three conditions, i.e.

$0.9f < d_2 + d_3 + d_4 < 1.3f$ (1)
$0.8f < R_6 < 1.2f$ (2)
$1.46 < n_{1d} < 1.65$
$1.46 < n_{2d} < 1.65$
$1.46 < n_{4d} < 1.65$
$50 < \nu_{1d} < 68$
$50 < \nu_{2d} < 68$
$50 < \nu_{4d} < 68$
$\nu_{3d} < 35$ (3)

wherein $f$ designates the overall focal length of the system given for a wave length light of 6328 A, $R_6$ designates the radius of curvature of the cemented surface of the third lens component, $d_2$ and $d_4$ designate the separation between the first and second lens components and the separation between the second and third lens components, respectively, $d_3$ designates the axial thickness of the second lens component, $n_{1d}$, $n_{2d}$ and $n_{4d}$ designate the refractive indices of the first, second and fourth lenses for the d line, respectively, and $\nu_{1d}$, $\nu_{2d}$, $\nu_{3d}$ and $\nu_{4d}$ designate the Abbe numbers of the first, second, third and fourth lenses for the d line, respectively, the objective lens system being constructed according to the following constructional data:

f = 1.0, N.A. = 0.35, W.D. = 0.164, β = 13.50 X

| Lens | Radii | Thicknesses and separations | $n_d$ | $\nu_d$ |
|---|---|---|---|---|
| $L_1$ | $R_1$ ∞ | $d_1$ 0.486 | $n_{1d}$ 1.51633 | $\nu_{1d}$ 64.1 |
|  | $R_2$ −0.561 |  |  |  |
|  |  | $d_2$ 0.411 |  |  |
|  | $R_3$ ∞ |  |  |  |
| $L_2$ |  | $d_3$ 0.390 | $n_{2d}$ 1.51633 | $\nu_{2d}$ 64.1 |
|  | $R_4$ −1.345 |  |  |  |
|  |  | $d_4$ 0.359 |  |  |
|  | $R_5$ 2.332 |  |  |  |
| $L_3$ |  | $d_5$ 0.211 | $n_{3d}$ 1.74077 | $\nu_{3d}$ 27.8 |
|  | $R_6$ 0.885 |  |  |  |
| $L_4$ |  | $d_6$ 0.378 | $n_{4d}$ 1.51633 | $\nu_{4d}$ 64.1 |
|  | $R_7$ −2.101 |  |  |  | wherein $R_1$ to $R_7$ inclusive designate the lens curvatures, $d_1$, $d_3$, $d_5$ and $d_6$ designate the axial thicknesses of the first, second, third and fourth lenses, respectively, $d_2$ and $d_4$ designate the space between the first and second lenses and the space between the second and third lenses, respectively, $n_{1d}$ to $n_{4d}$ inclusive designate the refractive indices of the glass for the d line of the spectrum for the respective lenses and $\nu_{1d}$ to $\nu_{4d}$ inclusive designate the Abbe numbers of the lenses for the d line numbering from the front to the rear of said system.

* * * * *